US011279370B2

(12) United States Patent
Sekiguchi

(10) Patent No.: US 11,279,370 B2
(45) Date of Patent: Mar. 22, 2022

(54) DRIVING CONTROL SYSTEM AND DRIVE ASSIST METHOD

(71) Applicant: MITSUBISHI ELECTRIC CORPORATION, Tokyo (JP)

(72) Inventor: Ryota Sekiguchi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 104 days.

(21) Appl. No.: 16/620,593

(22) PCT Filed: Jul. 26, 2017

(86) PCT No.: PCT/JP2017/026988
§ 371 (c)(1),
(2) Date: Dec. 9, 2019

(87) PCT Pub. No.: WO2019/021381
PCT Pub. Date: Jan. 31, 2019

(65) Prior Publication Data
US 2020/0139987 A1    May 7, 2020

(51) Int. Cl.
*B60W 50/00* (2006.01)
*B60W 50/04* (2006.01)
(Continued)

(52) U.S. Cl.
CPC ....... *B60W 50/045* (2013.01); *B60R 16/0231* (2013.01); *G07C 5/0808* (2013.01);
(Continued)

(58) Field of Classification Search
CPC ....... B60W 50/045; B60W 2554/4041; B60W 2554/4029; B60W 2554/4042; B60R 16/0231; G07C 5/0808; H04L 67/12
See application file for complete search history.

(56) References Cited

U.S. PATENT DOCUMENTS

| 6,052,632 A | 4/2000 | Iihoshi et al. |
| 11,175,906 B2 * | 11/2021 | Jeong ........................ G06F 8/66 717/168 |

(Continued)

FOREIGN PATENT DOCUMENTS

| JP | 10-243004 A | 9/1998 |
| JP | 2000-92083 A | 3/2000 |

(Continued)

OTHER PUBLICATIONS

Indian Office Action for Indian Application No. 202047000247, dated Apr. 5, 2021, with an English translation.

(Continued)

*Primary Examiner* — Thomas G Black
*Assistant Examiner* — Brittany Renee Peko
(74) *Attorney, Agent, or Firm* — Birch, Stewart, Kolasch & Birch, LLP

(57) ABSTRACT

A drive assistant (700) executes a drive assist function that is a function of a drive assist system. A first electronic control apparatus (401) has a first sensor (501). A second electronic control apparatus (402) has a second sensor (502). The first electronic control apparatus (401) is connected to the drive assistant (700) via a main network (10). The second electronic control apparatus (402) is connected to the first electronic control apparatus (401) via a sub-network (20) having no connection to the drive assistant (700). The first electronic control apparatus (401) outputs, to the main network (10), control assist information generated on the basis of first sensing information acquired by the first sensor (501) and second sensing information acquired by the second sensor (502).

9 Claims, 12 Drawing Sheets

(51) Int. Cl.
    *B60R 16/023*     (2006.01)
    *G07C 5/08*     (2006.01)
    *H04L 67/12*     (2022.01)

(52) U.S. Cl.
    CPC ......... *H04L 67/12* (2013.01); *B60W 2420/42* (2013.01); *B60W 2554/4029* (2020.02); *B60W 2554/4041* (2020.02); *B60W 2554/4042* (2020.02)

(56) References Cited

U.S. PATENT DOCUMENTS

| | | |
|---|---|---|
| 2012/0084482 A1 | 4/2012 | Yamanaka et al. |
| 2016/0059853 A1 | 3/2016 | Yamakoshi et al. |
| 2017/0021835 A1 | 1/2017 | Kojima |
| 2017/0277566 A1* | 3/2017 | Okamoto .............. G06F 9/5011 |
| 2017/0297570 A1 | 10/2017 | Yamakoshi et al. |
| 2017/0372535 A1* | 12/2017 | Miller .................. G07C 5/0808 |
| 2018/0037227 A1* | 2/2018 | D'sa ..................... B60W 30/16 |
| 2019/0210601 A1 | 7/2019 | Kojima |
| 2020/0310782 A1* | 10/2020 | Ujiie ........................ G06F 8/65 |

FOREIGN PATENT DOCUMENTS

| | | |
|---|---|---|
| JP | 2001-326671 A | 11/2001 |
| JP | 2003-291692 A | 10/2003 |
| JP | 2006-192970 A | 7/2006 |
| JP | 2009-53920 A | 3/2009 |
| JP | 2012-80379 A | 4/2012 |
| JP | 2014-146997 A | 8/2014 |
| JP | 2014-162383 A | 9/2014 |
| JP | 2016-48819 A | 4/2016 |
| JP | 2016-112909 A | 6/2016 |
| JP | 2016-174245 A | 9/2016 |
| JP | 2017-7552 A | 1/2017 |
| JP | 2017-24567 A | 2/2017 |
| JP | 2017-34340 A | 2/2017 |

OTHER PUBLICATIONS

International Search Report, issued in PCT/JP2017/026988, PCT/ISA/210, dated Oct. 31, 2017.

* cited by examiner

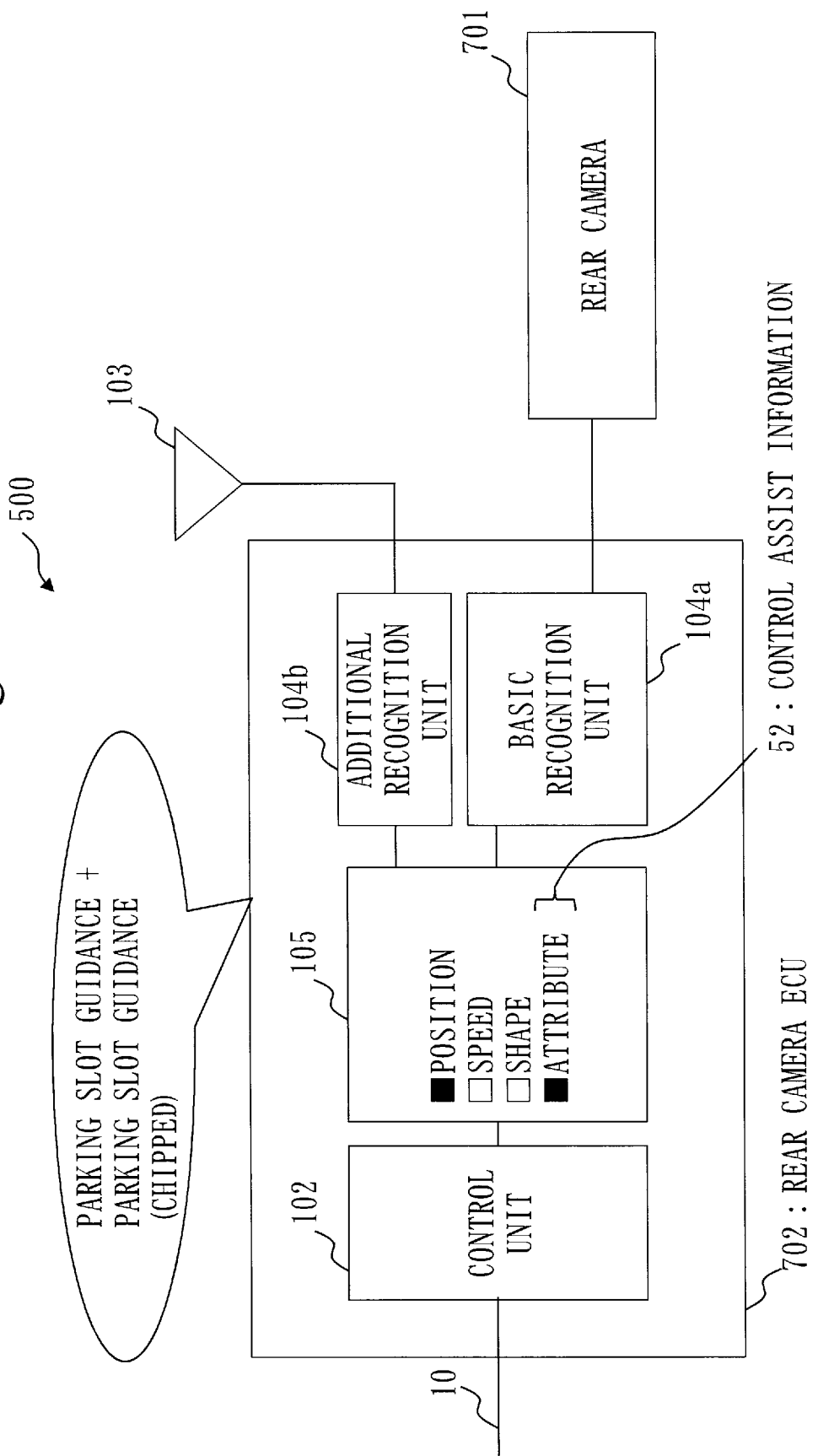

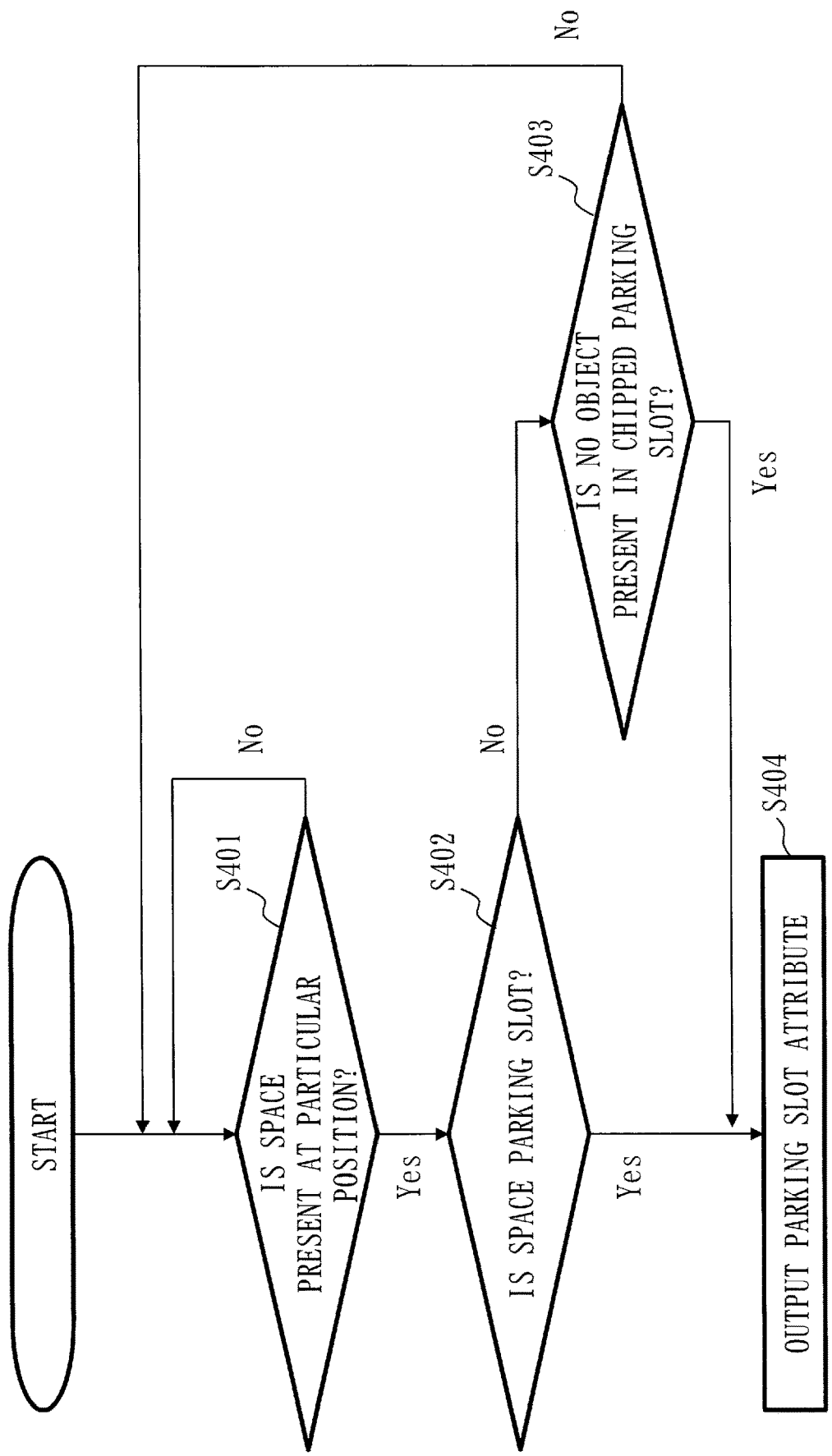

DRIVING CONTROL SYSTEM AND DRIVE ASSIST METHOD

TECHNICAL FIELD

The present invention relates to a driving control system and a drive assist method.

BACKGROUND ART

Drive-assist-related electronic control apparatuses (ECUs) used in drive assist systems or self-driving systems have been under development in these years. Hereinafter, a drive assist system or a self-driving system will be referred to as a driving control system. Development of a drive-assist-related electronic control apparatus has the aim of cutting down on traffic accidents, clearing up or relieving traffic jams, and improving the comfort of a driver. As functions of a driving control system, autonomous emergency brake (AEB), adaptive cruise control (ACC), lane keep assist (LKA), and traffic jam assist (TJA) are known. AEB stands for Autonomous Emergency Brake, ACC stands for Adaptive Cruise Control, LKA stands for Lane Keep Assist, and TJA stands for Traffic Jam Assist.

The development cycle of a drive-assist-related electronic control apparatus which provides the above-described functions is shorter than the replacement cycle of an automobile itself. For this reason, to add a new function to a driving control system after shipment of an automobile from a factory, an electronic control apparatus needs to be loaded in advance with a mechanism designed with addition of a new function to the driving control system in mind.

Patent Literature 1 discloses a method for introducing, into a system network, a filtering controller which realizes disablement of a current drive assist ECU and enablement of an add-on ECU with the aim of function updating.

CITATION LIST

Patent Literature

Patent Literature 1: JP 2016-48819

SUMMARY OF INVENTION

Technical Problem

Patent Literature 1, however, involves introduction of a new apparatus into a system network and suffers the problem of increase in the complexity of diagnosis of the system network.

The present invention has as its object to facilitate addition of a function not expected at the time of shipment of an automobile from a factory in a drive-assist-related electronic control apparatus.

Solution to Problem

A driving control system according to the present invention includes:
 a drive assistant mounted on a vehicle to execute a drive assist function that is a function of a drive assist system;
 a first electronic control apparatus having a connection to a first sensor to recognize a status of surroundings of the vehicle and connected to the drive assistant via a main network; and
 a second electronic control apparatus connected to the first electronic control apparatus via a sub-network having no connection to the drive assistant and having a connection to a second sensor to recognize the status of the surroundings of the vehicle, wherein
 the first electronic control apparatus outputs, to the main network, control assist information for execution of the drive assist function, the control assist information being generated on the basis of first sensing information acquired by the first sensor and second sensing information acquired by the second sensor and received via the sub-network.

Advantageous Effects of Invention

In matters of an electronic control apparatus according to the present invention, the first electronic control apparatus is connected to the second electronic control apparatus via the sub-network having no connection to the drive assistant. The first electronic control apparatus outputs, to the main network, the control assist information generated on the basis of the first sensing information acquired by the first sensor and the second sensing information acquired by the second sensor and received via the sub-network. Thus, the electronic control apparatus according to the present invention is capable of facilitating addition of a function using the sub-network different from the main network.

BRIEF DESCRIPTION OF DRAWINGS

FIG. 11 is a logical configuration diagram of an electronic control apparatus 500 according to Embodiment 5.
FIG. 12 is a flowchart showing operation of a driving control system 600 according to Embodiment 5.

DESCRIPTION OF EMBODIMENTS

Figure 1:
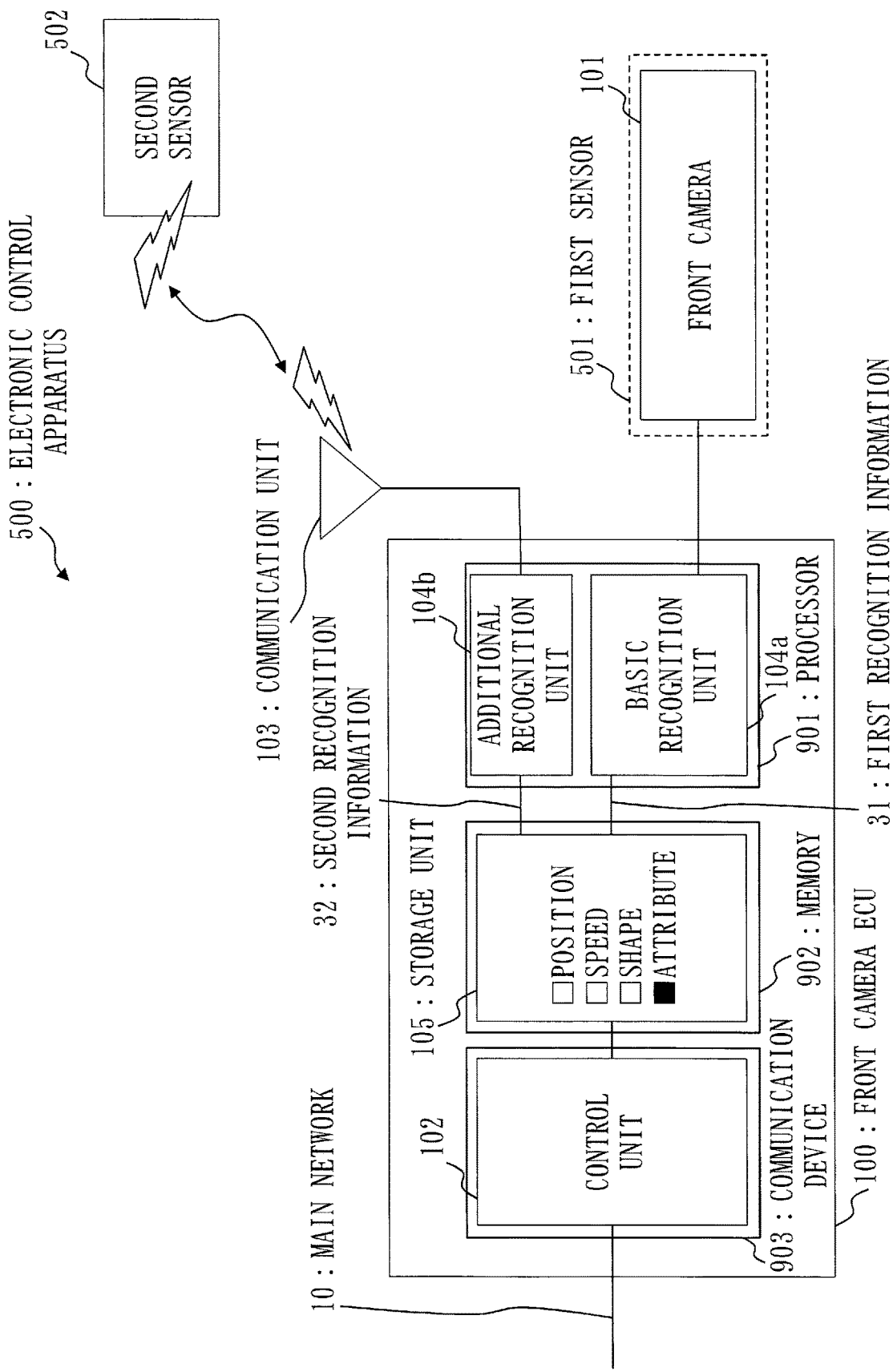
FIG. 1 is a configuration diagram of an electronic control apparatus 500 according to Embodiment 1.

Embodiments of the present invention will be described below with reference to the drawings. Note that, throughout the drawings, the same or corresponding portions are denoted by the same reference characters. In the description of the embodiments, a description of the same or a corresponding portion will be appropriately omitted or simplified.

Embodiment 1

\*\*\* Description of Configuration \*\*\* A configuration of an electronic control apparatus 500 according to the present embodiment will be described with reference to FIG. 1. FIG. 1 illustrates a logical configuration and a physical configuration of the electronic control apparatus 500.

The present embodiment will describe a front camera ECU 100 as an example of the electronic control apparatus 500. Note that the electronic control apparatus 500 is an example of a first electronic control apparatus 401 (to be described later).

The front camera ECU 100 includes a control unit 102, a storage unit 105, a basic recognition unit 104a, and an additional recognition unit 104b in terms of a logical configuration. The front camera ECU 100 has connections to a front camera 101 and a communication unit 103.

The electronic control apparatus 500 is connected to a first sensor 501, such as a radar, a sonar, a lidar, a camera, or a laser, which senses a surrounding environment. In FIG. 1, the front camera 101 is connected as the first sensor 501. A sensor using electromagnetic waves, such as an electric field, a magnetic field, radio waves, infrared rays, light, or radiations, or a sensor using sound waves, such as low-frequency waves or ultrasonic waves, may be used as the first sensor 501.

<Control Unit 102>

The control unit 102 controls input and output from and to a main network 10. The control unit 102 performs signal conversion for outputting recognition information stored in the storage unit 105 to the main network 10. The control unit 102 is realized by a communication device 903. For example, if a communication standard for the main network 10 is CAN (Control Area Network), the control unit 102 is realized by a CAN transceiver and a CAN controller.

<Basic Recognition Unit 104a>

The basic recognition unit 104a performs an arithmetic operation on the basis of first sensing information from the first sensor 501 and identifies, as first recognition information, a part of recognition information on an object on surroundings of a vehicle. A specific example of the vehicle is an automobile. The basic recognition unit 104a is realized by a processor 901 which performs logic processing in a time period sufficiently shorter than an interval, at which information from the first sensor 501 is updated. A specific example of the processor 901 is an MCU (Micro Control Unit), such as a microcomputer or a microprocessor.

<Storage Unit 105>

The storage unit 105 stores, as first recognition information, object recognition information recognized by the basic recognition unit 104a. The object recognition information refers to the position, the speed, the shape, and an attribute of one structure or a sequence of structures at a given time. The attribute represents, for example, an object type, such as a person, a car, a lane, a guardrail, or a sign. The storage unit 105 stores the first recognition information. The storage unit 105 is provided in a memory 902, which is readable/writable in a time period sufficiently shorter than an interval, at which the first recognition information is updated. A specific example of the memory 902 is a RAM (Random Access Memory) or a ROM (Read Only Memory).

Diagnosis in case of a failure is performed on the control unit 102, the storage unit 105, the basic recognition unit 104a, and the front camera 101 via the main network 10. A function of making a self-diagnosis of each of a communication disturbance, a memory abnormality, an internal abnormality, and a sensor abnormality may be implemented in each of the control unit 102, the storage unit 105, the basic recognition unit 104a, and the front camera 101. If each device judges itself to be unable to maintain a function on the basis of diagnosis, the device may have a function implemented therein of diagnosing itself as function impairment and outputting a diagnosis result.

A basic configuration of the electronic control apparatus 500 according to the present embodiment is as described above. A basic function of the electronic control apparatus 500 at the time of factory shipment is executed when a part of object recognition information necessary for the basic function is identified. More specifically, an attribute in the storage unit 105 may be identified, and a value may be assigned to a storage element. A position, a speed, and a shape may not be identified, and invalid values may be assigned to storage elements.

<Communication Unit 103>

The communication unit 103 communicates with a second sensor 502, such as a radar, a sonar, a lidar, a camera, or a laser. The second sensor 502 is provided outside the front camera ECU 100 as the electronic control apparatus 500. The second sensor 502 is also referred to as an additional sensor. The communication unit 103 performs signal conversion to output sensing information from the additional sensor to the additional recognition unit 104b. The communication unit 103 may perform signal conversion to output first sensing information from the first sensor 501 to the additional sensor. The communication unit 103 has a terminal or an antenna for communication with the additional sensor. A specific example of a communication standard used by the communication unit 103 is CAN, FlexRay, or MOST (Media Oriented Systems Transport) common for vehicles, or Ethernet (registered trademark). For example, if the communication standard is Ethernet (registered trademark), the communication unit 103 is realized by an Ethernet physical layer transceiver and a terminal. With this configuration, the communication unit 103 can support an additional sensor relatively large in transmission capacity, such as a sensor which transmits a camera image.

<Additional Recognition Unit 104b>

The additional recognition unit 104b identifies a part of recognition information to recognize the surrounding environment again at the time of communication of the communication unit 103 with the additional sensor. At this time, the storage unit 105 stores recognition information recognized by the additional recognition unit 104b. The additional recognition unit 104b performs an arithmetic operation on the basis of sensing information from the additional sensor and identifies a part of object recognition information. The additional recognition unit 104b is realized by the processor 901 that performs logic processing in a time period sufficiently shorter than an interval, at which information from the second sensor 502 is updated. Logically, the additional recognition unit 104b is separate from the basic recognition unit 104a. However, physically, the additional recognition unit 104b and the basic recognition unit 104a may be realized by the one processor 901.

The storage unit 105 stores, as second recognition information, object recognition information recognized by the additional recognition unit 104b. That is, the storage unit 105 stores both first recognition information recognized by the basic recognition unit 104a and second recognition information recognized by the additional recognition unit 104b. It is preferable to use one unit as a physical configuration in order for the storage unit 105 to store pieces of recognition information at a given time.

Diagnosis in case of a failure is performed on the additional recognition unit 104b via the main network 10. The additional recognition unit 104b has a function implemented therein of diagnosing itself as impairment of additional function and outputting a diagnosis result if the additional recognition unit 104b diagnoses itself as unable to maintain an additional function. This has the advantage in preventing diagnosis of an additional function from being complicated. Additionally, only the basic function can be maintained in case of impairment of additional function, which leads to the advantage of simplifying processing in case of function impairment.

The processor 901 is a device which executes an electronic control program. The electronic control program is a program which realizes functions of the electronic control apparatus 500. A drive assist method is realized when the electronic control program is executed by the processor 901.

The processor 901 is an IC (Integrated Circuit) which performs arithmetic processing.

The electronic control program is read by the processor 901 and is executed by the processor 901. The memory 902 stores not only the electronic control program but also an OS (Operating System). The processor 901 executes the electronic control program while executing the OS. The electronic control program and the OS may be stored in an auxiliary storage device. The electronic control program and the OS stored in the auxiliary storage device are loaded into the memory 902 and are executed by the processor 901. Note that a part or the whole of the electronic control program may be incorporated in the OS.

Figure 2:
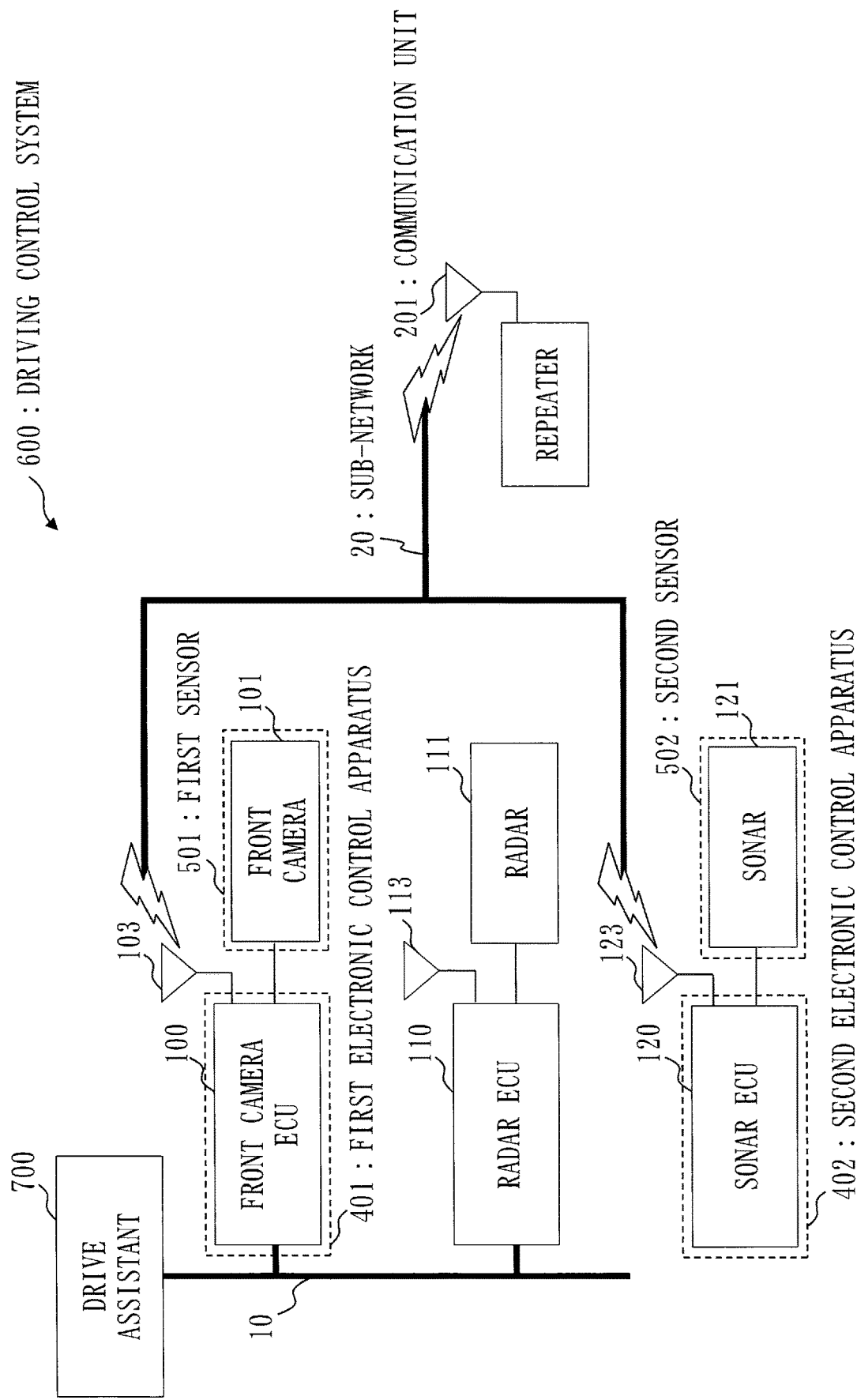
FIG. 2 is a configuration diagram showing an example of a driving control system 600 according to Embodiment 1.

FIG. 2 is a configuration diagram showing an example of a driving control system 600 according to the present embodiment.

The driving control system 600 includes a drive assistant 700, the main network 10, the first electronic control apparatus 401, a second electronic control apparatus 402, and a sub-network 20.

The drive assistant 700 is mounted on a vehicle and executes drive assist functions which are functions of a drive assist system. The drive assistant 700 is, for example, a drive assist apparatus which executes the drive assist functions. Alternatively, the drive assistant 700 may be built into an instrument to be controlled, such as a brake or steering.

The first electronic control apparatus 401 has a connection to the first sensor 501 that recognizes the status of surroundings of the vehicle and is connected to the drive assistant 700 via the main network 10.

The second electronic control apparatus 402 is connected to the first electronic control apparatus 401 via the sub-network 20 having no connection to the drive assistant 700. The second electronic control apparatus 402 has a connection to the second sensor 502 that recognizes the status of the surroundings of the vehicle.

As shown in FIG. 2, in the driving control system 600, the drive assistant 700, the front camera ECU 100, and a radar ECU 110 are connected via the main network 10. In FIG. 2, the main network 10 is a network which serves as a core of the driving control system 600. The main network 10 is, for example, the CAN bus. The drive assistant 700 executes various drive-assist-related functions on the basis of pieces of information output from the front camera ECU 100 and the radar ECU 110.

The front camera ECU 100 and a sonar ECU 120 are connected via the sub-network 20. The front camera ECU 100 and the sonar ECU 120 input and output sensing information from and to each other via the sub-network 20. The sub-network 20 is, for example, a LAN (Local Area Network).

The sub-network 20 may include a repeater. The repeater is connected to the sub-network 20 to relay communication between the first electronic control apparatus 401 and the second electronic control apparatus 402. More specifically, the repeater includes a communication unit 201 which inputs and outputs sensing information output from the front camera ECU 100 or the sonar ECU 120.

Here, a sonar 121 is not connected to the main network 10. The sonar 121 is connected only to the sub-network 20. Sensing information from the sonar 121 is stored in the storage unit 105 of the front camera ECU 100. The drive assistant 700 executes an additional function using pieces of sensing information from the front camera 101 and the sonar 121.

In FIG. 2, the front camera ECU 100 is an example of the first electronic control apparatus 401. The sonar ECU 120 is an example of the second electronic control apparatus 402. The sonar 121 is an example of the second sensor 502.

As described above, according to the driving control system 600 in FIG. 2, the drive assistant 700 can easily execute an additional function if the sonar 121 as the second sensor is added after shipment of the vehicle from a factory.

Figure 3:
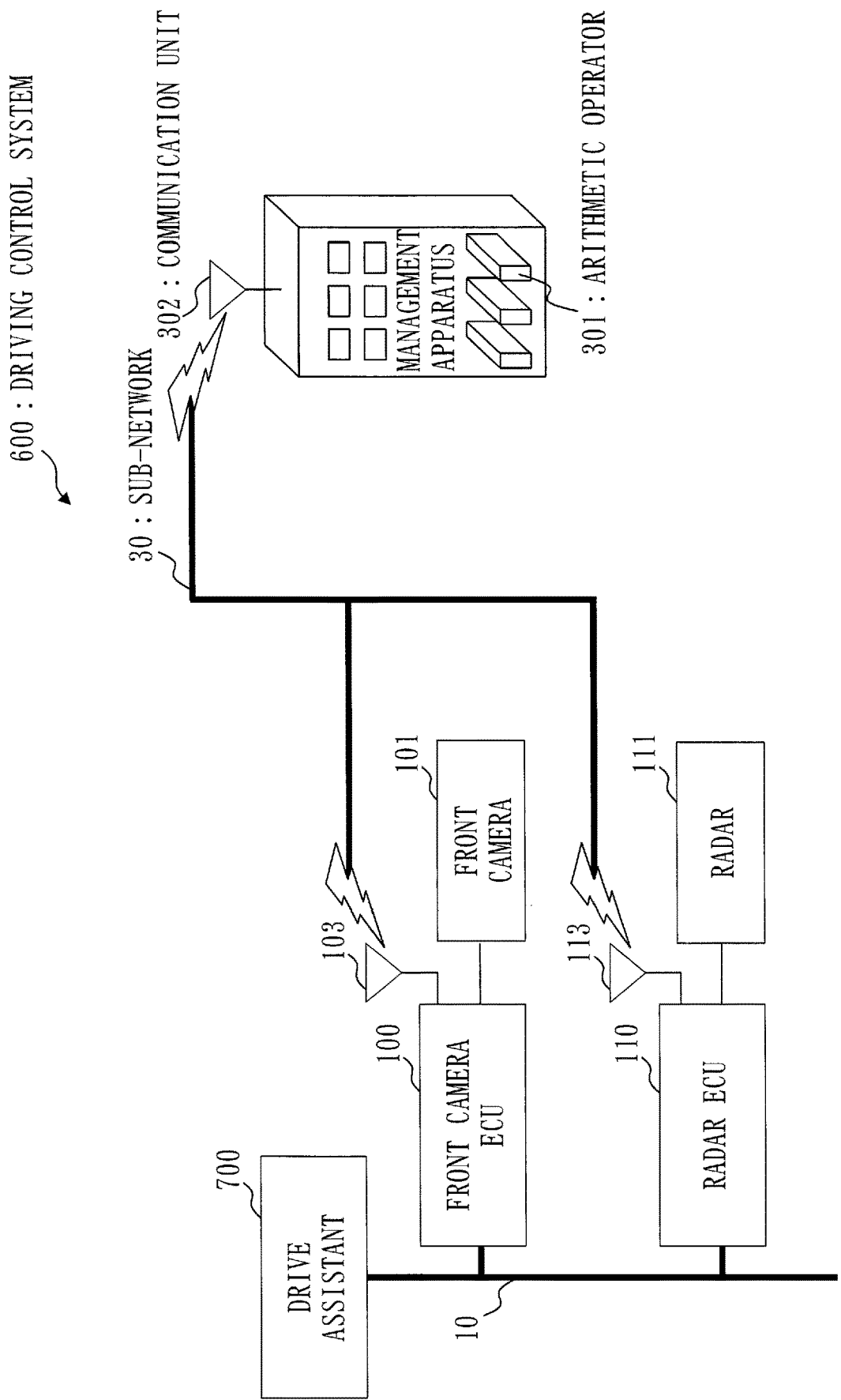
FIG. 3 is a configuration diagram showing another example of the driving control system 600 according to Embodiment 1.

FIG. 3 is a configuration diagram showing another example of the driving control system 600 according to the present embodiment.

In FIG. 3, a sub-network 30 is a network, over which pieces of sensing information from the front camera ECU 100 and the radar ECU 110 are input and output. The sub-network 30 is, for example, a LAN. The sub-network 30 may include a management apparatus which has an arithmetic operator 301. The management apparatus may also include a communication unit 302 which inputs and outputs pieces of information output from the front camera ECU 100 and the radar ECU 110 from and to the arithmetic operator 301.

The front camera 101 and a radar 111 are connected to the main network 10 and to the sub-network 30. However, the sub-network 30 is useful for inputting and outputting sensing information, transmission capacity of which cannot be handled by the communication standard for the main network 10. The front camera ECU 100 performs an arithmetic operation on the basis of a camera image output from the front camera 101 and converts the camera image into recognition information. The front camera ECU 100 inputs the recognition information to the radar ECU 110 via the sub-network 30. Alternatively, the radar ECU 110 performs an arithmetic operation on the basis of a radio field intensity image output from the radar 111 and converts the radio field intensity image into recognition information. The radar ECU 110 may input the recognition information to the front camera ECU 100 via the sub-network 30. At this time, the arithmetic operation may be performed by the arithmetic operator 301 on the sub-network 30.

As described above, the driving control system 600 in FIG. 3 can add, at a desired time, a function based on information previously not transmittable or computable to a configuration at the time of shipment of a vehicle from a factory.

* Description of Operation *

Operation of each component in the driving control system 600 will be described with reference to FIGS. 1 and 2.

The first electronic control apparatus 401 outputs control assist information for execution of the drive assist functions to the main network 10. The control assist information is information generated on the basis of first sensing information which is acquired by the first sensor 501 and second sensing information which is acquired by the second sensor 502 and is received via the sub-network 20.

The basic recognition unit 104a calculates first recognition information on surroundings of the vehicle using the first sensing information acquired from the first sensor 501. The basic recognition unit 104a stores the first recognition information in the storage unit 105.

The control unit 102 outputs first control information for execution of a basic function of the drive assist functions to the main network 10 on the basis of the first recognition information stored in the storage unit 105. The basic function here is a function implemented in the first electronic control apparatus 401 at the time of the shipment of the vehicle from the factory.

The communication unit 103 acquires the second sensing information from the second sensor 502 outside the first electronic control apparatus 401. The communication unit 103 acquires the second sensing information via the sub-network 20 different from the main network 10. The sub-network 20 here has no connection to the drive assistant 700.

The additional recognition unit 104b calculates second recognition information on the surroundings of the vehicle using the second sensing information acquired by the communication unit 103. The additional recognition unit 104b stores the second recognition information in the storage unit 105.

The control unit 102 outputs second control information for execution of an additional function of the drive assist functions to the main network 10 on the basis of the first recognition information and the second recognition information stored in the storage unit 105. The second control information for execution of the additional function is an example of the control assist information for execution of the drive assist functions. The additional function here is a drive assist function different from the basic function. The additional function is also a function not implemented in the electronic control apparatus 500 at the time of the shipment of the vehicle from the factory.

The driving control system 600 performs a diagnosis process S10 of making a diagnosis as to whether the additional function can be maintained and, if the additional function is not maintainable, maintaining only the basic function.

Figure 4:
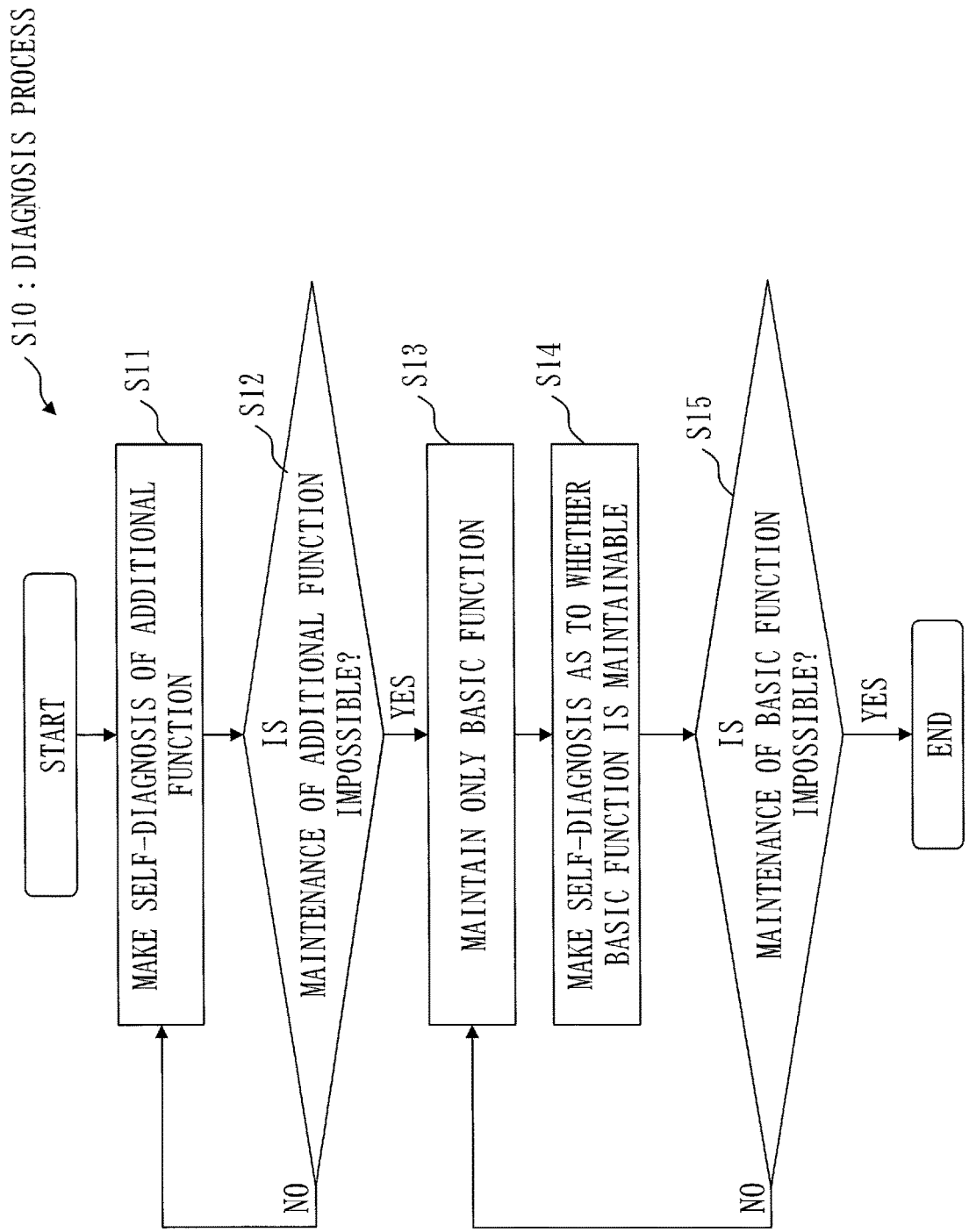
FIG. 4 is a flowchart showing an electronic control process S100 by the electronic control apparatus 500 according to Embodiment 1.

An example of the diagnosis process S10 according to the present embodiment will be described with reference to FIG. 4.

In step S11, the additional recognition unit 104b makes a self-diagnosis as to whether the additional function is maintainable.

If it is determined in step S12 through the diagnosis that maintenance of the additional function is impossible, the process advances to step S13. If it is determined in step S12 through the diagnosis that maintenance of the additional function is possible, the process returns to step S11.

In step S13, the first electronic control apparatus 401 maintains only the basic function.

In step S14, the basic recognition unit 104a makes a self-diagnosis as to whether the basic function is maintainable. The control unit, the storage unit, and the first sensor each make a self-diagnosis. The basic function is maintained only in, for example, a case where the self-diagnoses by the components all indicate normalcy.

If it is determined in step S15 through the self-diagnoses by the control unit, the storage unit, and the first sensor that maintenance of the basic function is impossible, the process ends. If none of the self-diagnoses by the control unit, the storage unit, and the first sensor indicates impossibility of diagnosis, the process returns to step S13.

* Other Configurations *

In FIG. 2, the driving control system 600 may include an arithmetic operator instead of the repeater. The arithmetic operator may receive second sensing information from the second electronic control apparatus 402 and calculate second recognition information on the basis of the second sensing information. The arithmetic operator may transmit the second recognition information to the first electronic control apparatus 401 via a communication unit. This configuration eliminates the need for the additional recognition unit 104b of the first electronic control apparatus 401 to calculate second recognition information on the basis of second sensing information.

Although the functions of the electronic control apparatus 500 are realized by software in the present embodiment, the functions of the electronic control apparatus 500 may be realized by hardware as a modification.

The electronic control apparatus 500 may include electronic circuits which realize the functions of the electronic control apparatus 500. Each electronic circuit is, for example, a single circuit, a composite circuit, a programmed processor, a parallel-programmed processor, a logic IC, a GA, an ASIC, or an FPGA. GA stands for Gate Array, ASIC stands for Application Specific Integrated Circuit, and FPGA stands for Field-Programmable Gate Array.

As another modification, one(s) of functions of the components of the electronic control apparatus 500 may be realized by an electronic circuit, and the other functions may be realized by software.

The processors and the electronic circuits are also referred to as processing circuitry. That is, in the electronic control apparatus 500, the functions of the electronic control apparatus 500 are realized by the processing circuitry.

In the electronic control apparatus 500, the term "unit" in each unit of the electronic control apparatus 500 may be replaced with the term "step". The term "process" in each of an electronic control process, a basic recognition process, a first control process, a communication process, an additional recognition process, and a second control process may be replaced with the term "program", the term "program product", or the term "computer-readable recording medium having a program recorded thereon".

Description of Advantageous Effects of Present Embodiment

As described above, the driving control system 600 according to the present embodiment can easily realize an additional function not implemented at the time of shipment of a vehicle from a factory. The additional function is executed when a part of object recognition information necessary for the additional function is identified again. The driving control system 600 according to the present embodiment can acquire recognition information necessary for control assist information for execution of the additional function via a sub-network. Output of the recognition information to the main network 10 contributes to vehicle control by the driving control system 600.

The driving control system 600 and the electronic control apparatus 500 according to the present embodiment do not require introduction of a new apparatus into the main network 10. In the driving control system 600 and the electronic control apparatus 500 according to the present embodiment, a basic function at the time of shipment of a vehicle from a factory and an additional function not present at the time of the shipment of the vehicle from the factory are achieved by almost the same configuration. Thus, the driving control system 600 and the electronic control apparatus 500 according to the present embodiment can easily realize an additional function without increase in the complexity of diagnosis of the electronic control apparatus 500.

Embodiment 2

Respects to be added to and different from Embodiment 1 will be described in the present embodiment. Note that the same components as those in Embodiment 1 are denoted by the same reference characters and that a description thereof may be omitted.

Figure 5:
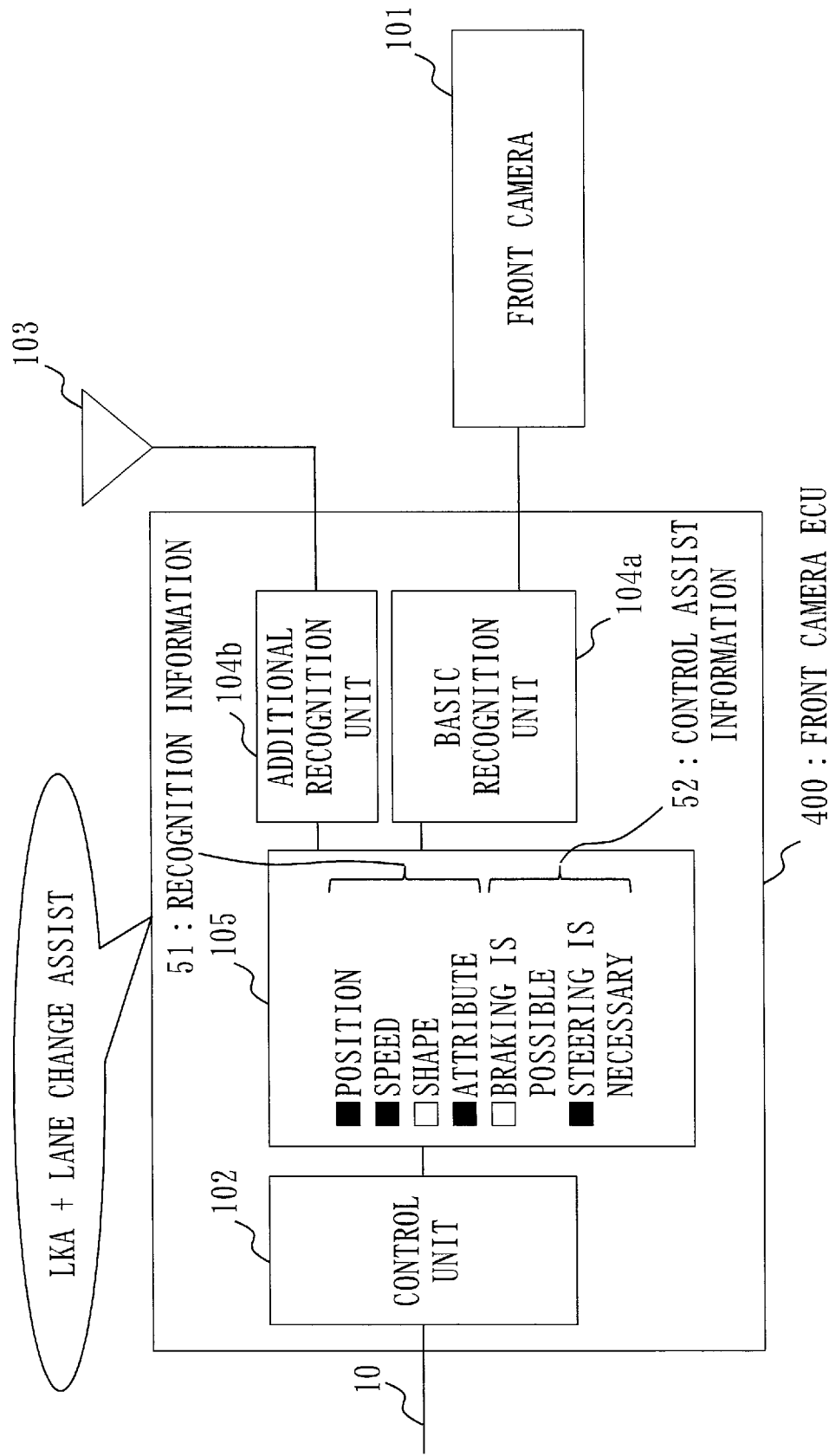
FIG. 5 is a logical configuration diagram of an electronic control apparatus 500 according to Embodiment 2.
Figure 6:
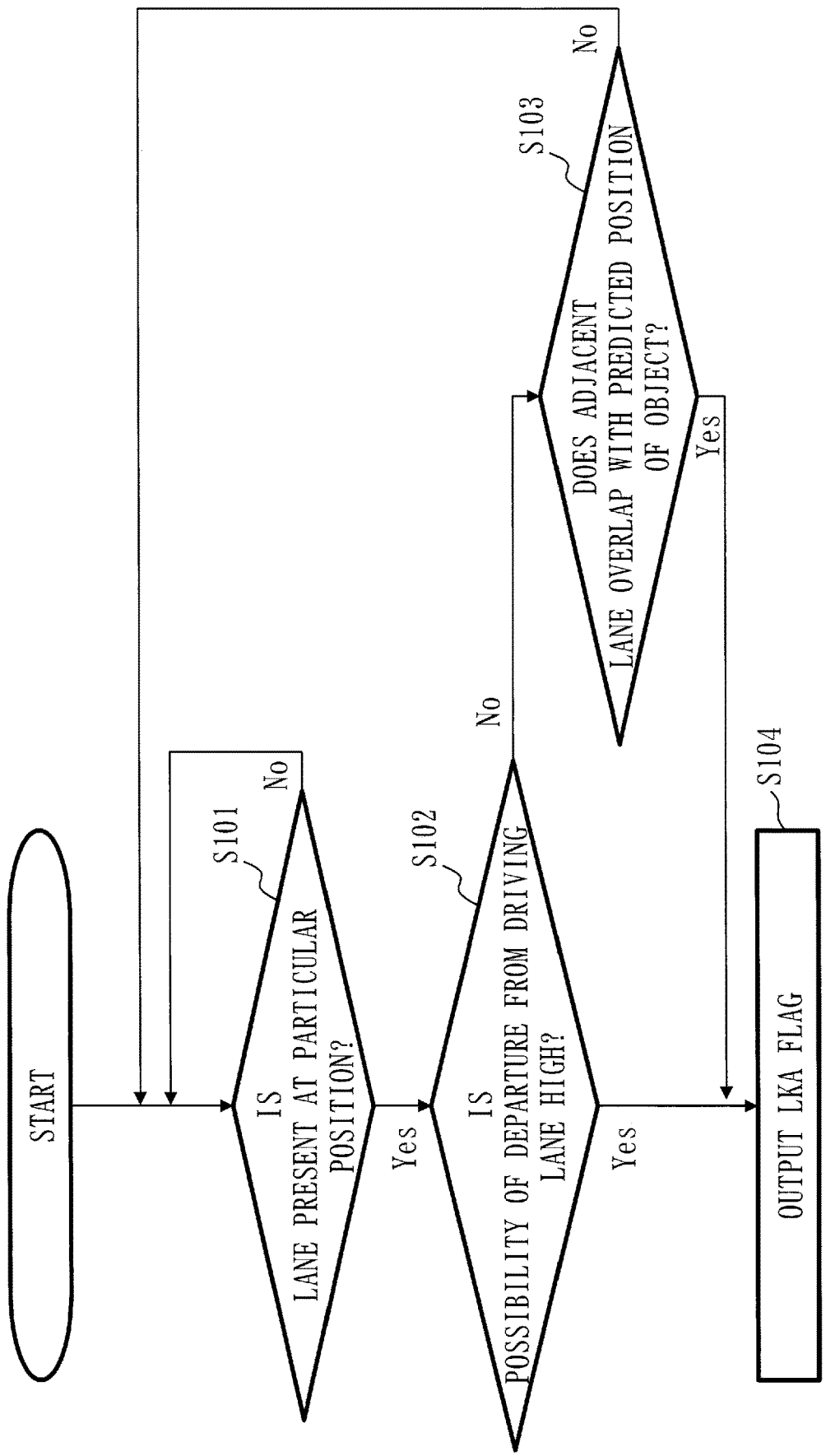
FIG. 6 is a flowchart showing operation of a driving control system 600 according to Embodiment 2.

Operation of an electronic control apparatus 500 and a driving control system 600 according to the present embodiment will be described with reference to FIGS. 5 and 6. FIG. 5 is a diagram showing an example of a logical configuration of the electronic control apparatus 500 according to the present embodiment. FIG. 6 is a flowchart showing operation of the driving control system 600 according to the present embodiment.

A front camera ECU 400 will be described as the electronic control apparatus 500 in the present embodiment.

The front camera ECU 400 has lane keep assist, that is, LKA as a basic function at the time of shipment of a vehicle from a factory. The position of a lane on a road and a lane attribute are stored as recognition information 51. A radar ECU 110 has a blind spot warning function as a basic function at the time of the shipment from the factory. The position and the speed of a vehicle behind to overtake are stored as recognition information.

The driving control system 600 realizes a lane change assist function as an additional function for the front camera ECU 400. For this reason, the front camera ECU 400 acquires second sensing information on the position and speed of the vehicle behind to overtake from a radar 111. The front camera ECU 400 acquires the second sensing information from the radar 111 via a sub-network 20 and calculates the position and speed of the vehicle to overtake as recognition information with an additional recognition unit 104b. Alternatively, the front camera ECU 400 may acquire recognition information calculated by the radar ECU 110 from the radar ECU 110 via a main network 10. With this acquirement, the front camera ECU 400 stores, as the recognition information 51, the position and speed of the vehicle behind to overtake and the lane attribute.

In step S101, a basic recognition unit 104a judges whether a lane is present at a particular position. If a lane is present at the particular position, the basic recognition unit 104a advances to step S102.

In step S102, the basic recognition unit 104a judges whether the possibility of departure from a driving lane is high. If the possibility of departure from the driving lane is low, the basic recognition unit 104a advances to step S103. If the possibility of departure from the driving lane is high, the basic recognition unit 104a advances to step S104.

In step S103, the additional recognition unit 104b judges whether an adjacent lane overlaps with a predicted position of an object. The front camera ECU 400 stores in advance the position of the adjacent lane on the road. If it is predicted and judged that a predicted position of the vehicle to overtake from the radar 111 overlaps with the position of the adjacent lane, the additional recognition unit 104b advances to step S104.

In step S104, the additional recognition unit 104b outputs control assist information 52 necessary for execution of LKA at a desired time to the main network 10 through a storage unit 105. The control assist information 52 necessary for execution of LKA is also referred to as an LKA flag.

As described above, two times are available as a time when the control assist information 52 regarding whether steering is necessary is stored in the storage unit 105. The first one is a time when the basic recognition unit 104a judges that "the host vehicle departs from the driving lane". In this case, the basic recognition unit 104a judges that steering for keeping in the driving lane is necessary and outputs the control assist information 52 that enables steering to the main network 10. The second one is a time when the additional recognition unit 104b judges that "the vehicle to overtake is located in the adjacent lane". In this case, the additional recognition unit 104b judges that steering for keeping in the driving lane is necessary and outputs the control assist information 52 that enables steering to the main network.

The driving control system 600 and the electronic control apparatus 500 according to the present embodiment can facilitate addition of a function not expected at the time of the shipment of the vehicle from the factory, which is associated with recognition of a surrounding environment, braking of the vehicle, or steering control.

Embodiment 3

Respects different from Embodiment 2 will be described in the present embodiment. Note that the same components as those in Embodiments 1 and 2 are denoted by the same reference characters and that a description thereof may be omitted.

Figure 7:
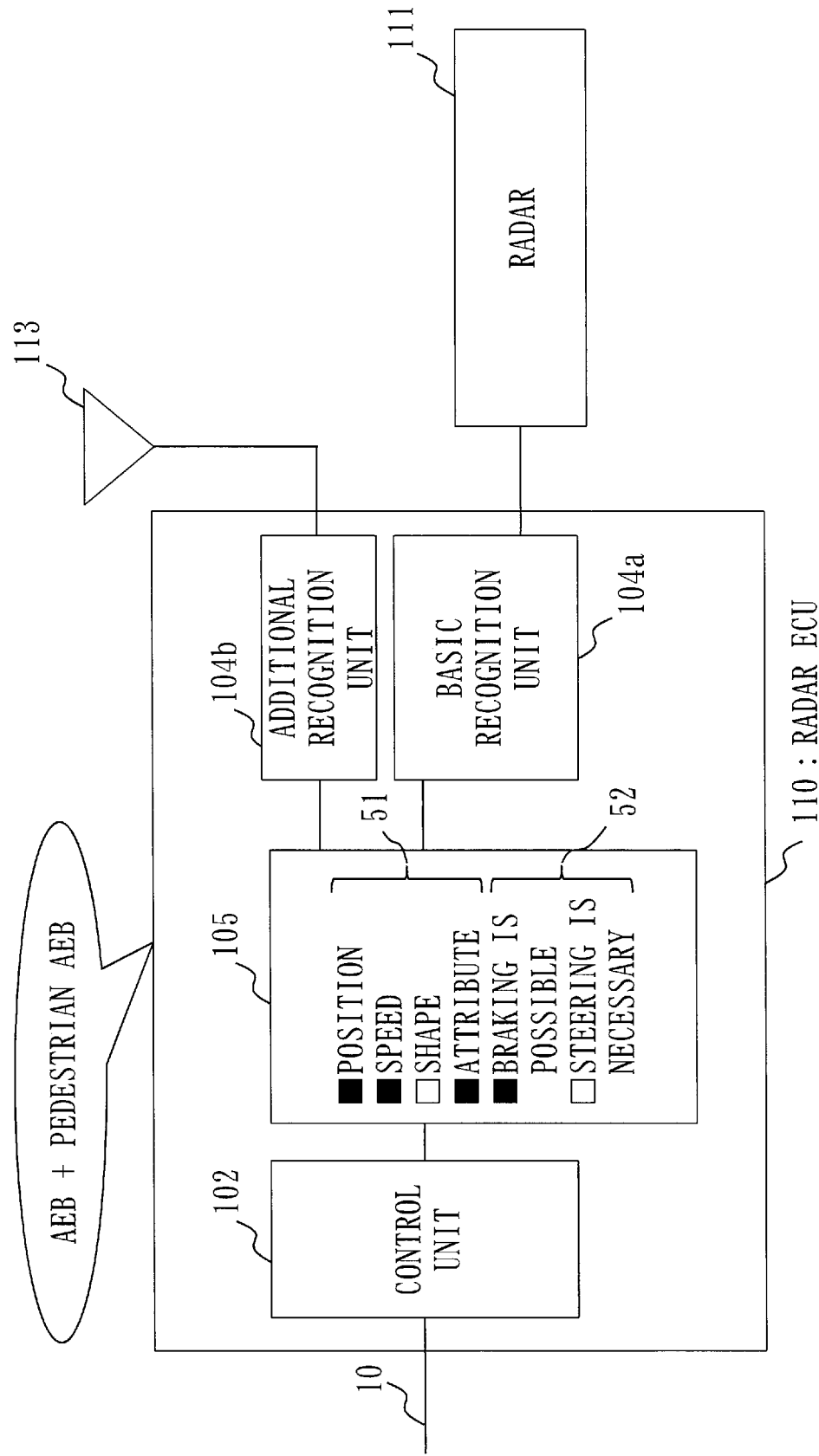
FIG. 7 is a logical configuration diagram of an electronic control apparatus 500 according to Embodiment 3.
Figure 8:
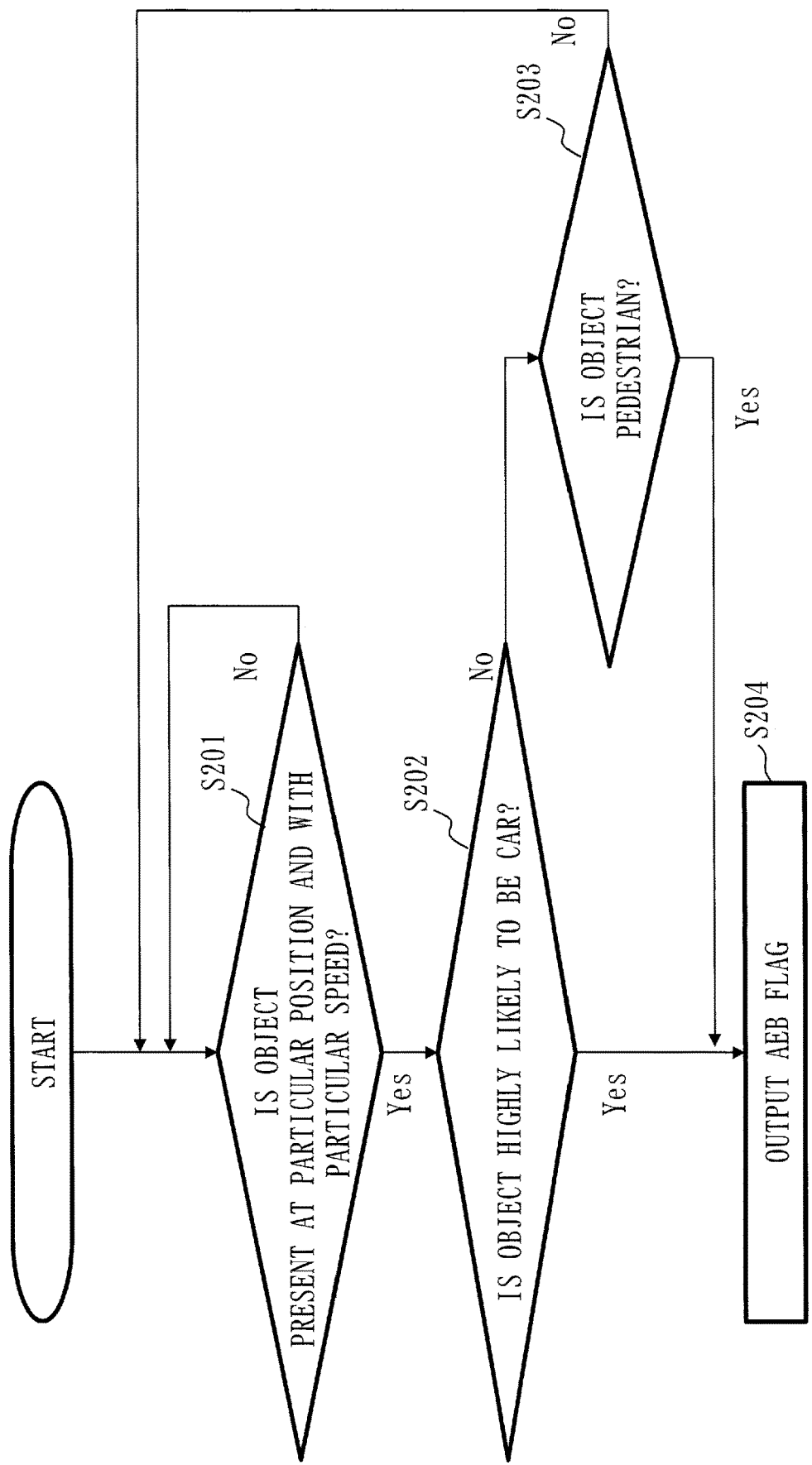
FIG. 8 is a flowchart showing operation of a driving control system 600 according to Embodiment 3.

Operation of an electronic control apparatus 500 and a driving control system 600 according to the present embodiment will be described with reference to FIGS. 7 and 8. FIG. 7 is a diagram showing an example of a logical configuration of the electronic control apparatus 500 according to the present embodiment. FIG. 8 is a flowchart showing operation of the driving control system 600 according to the present embodiment.

In the present embodiment, a radar ECU 110 will be described as the electronic control apparatus 500.

A front camera ECU 100 has a forward collision warning function as a basic function at the time of shipment of a vehicle from a factory. The attribute of an object ahead is stored as recognition information 51. The attribute of the object ahead is a person or a car. The radar ECU 110 has autonomous emergency brake, that is, AEB as a basic function at the time of the shipment of the vehicle from the factory. The position and the speed of the object ahead are stored as recognition information.

The driving control system 600 realizes a pedestrian AEB function which operates for a pedestrian as an additional function for the radar ECU 110. For this reason, the radar ECU 110 acquires information on the attribute of the object ahead from the front camera ECU 100. More specifically, the radar ECU 110 acquires second sensing information from a front camera 101 via a sub-network 30 and calculates, as recognition information, the attribute of the object ahead with an additional recognition unit. Alternatively, the radar ECU 110 may acquire recognition information calculated by the front camera ECU 100 via a main network 10. With this acquirement, the radar ECU 110 stores, as the recognition information 51, the position, the speed, and the attribute of the object ahead.

In step S201, a basic recognition unit 104a judges whether an object is present ahead at a particular position and with a particular speed. If an object is present ahead at the particular position and with the particular speed, the basic recognition unit 104a advances to step S202.

In step S202, the basic recognition unit 104a judges whether the object is highly likely to be a car. If the object is less likely to be a car, the basic recognition unit 104a advances to step S203. If the object is highly likely to be a car, the basic recognition unit 104a advances to step S204.

In step S203, the additional recognition unit 104b judges whether the object is a pedestrian. If the object is a pedestrian, the additional recognition unit 104b advances to step S204.

In step S204, the additional recognition unit 104b outputs control assist information 52 for execution of AEB on the object to the main network 10 through a storage unit 105 at a time of the judgment that the object is a pedestrian. The control assist information 52 for execution of AEB is also referred to as an AEB flag. At this time, the additional recognition unit 104b stores, in the storage unit 105, the control assist information 52 indicating that the radar ECU 110 is capable of AEB, that is, the driving control system 600 is capable of braking.

Embodiment 4

Respects different from Embodiments 2 and 3 will be described in the present embodiment. Note that the same components as those in Embodiments 1 to 3 are denoted by the same reference characters and that a description thereof may be omitted.

Figure 9:
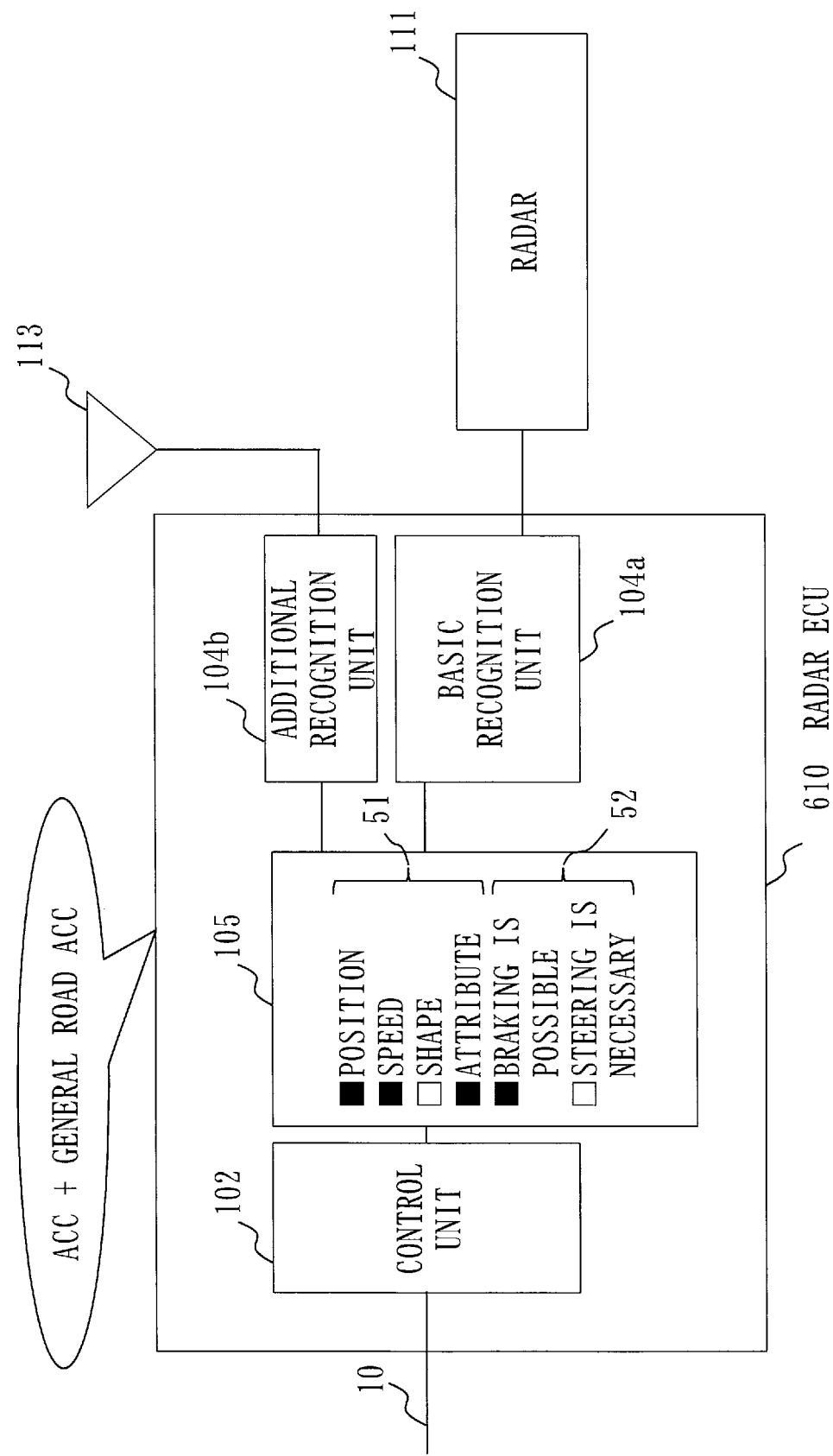
FIG. 9 is a logical configuration diagram of an electronic control apparatus 500 according to Embodiment 4.
Figure 10:
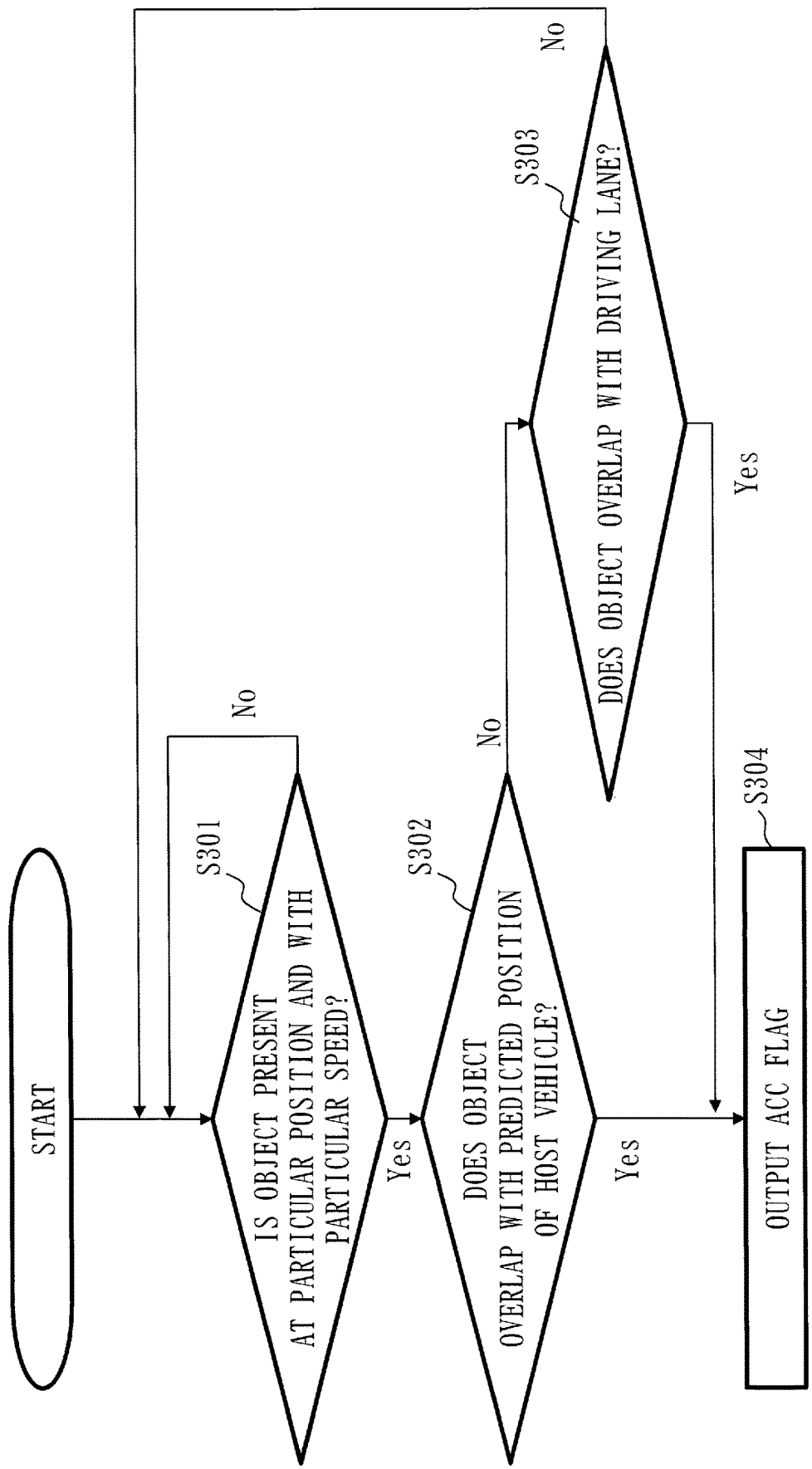
FIG. 10 is a flowchart showing operation of a driving control system 600 according to Embodiment 4.

Operation of an electronic control apparatus 500 and a driving control system 600 according to the present embodiment will be described with reference to FIGS. 9 and 10. FIG. 9 is a diagram showing an example of a logical configuration of the electronic control apparatus 500 according to the present embodiment. FIG. 10 is a flowchart showing operation of the driving control system 600 according to the present embodiment.

A radar ECU 610 will be described as the electronic control apparatus 500 according to the present embodiment.

A front camera ECU 400 has LKA as a basic function at the time of shipment of a vehicle from a factory. The position of a lane on a road and the attribute of the lane are stored as recognition information. The radar ECU 610 has adaptive cruise control, that is, ACC as a basic function at the time of the shipment of the vehicle from the factory. The position and the speed of a vehicle ahead are stored as recognition information 51.

The driving control system 600 realizes an ACC function for general roads, which are often roads with discontinuous curvature radii, as an additional function for the radar ECU 610. For this reason, the radar ECU 610 acquires the position and the attribute of a driving lane on the road from the front camera ECU 400. The radar ECU 610 acquires second sensing information from a front camera 101 via a sub-network 30 and calculates the position and attribute of the driving lane on the road with an additional recognition unit 104b. Alternatively, the radar ECU 610 may acquire recognition information calculated by the front camera ECU 400 via a main network 10. With this acquirement, the radar ECU 610 stores, as the recognition information 51, the position and speed of the vehicle ahead and the position and attribute of the driving lane on the road.

In step S301, a basic recognition unit 104a judges whether an object is present at a particular position and with a particular speed. If an object is present at the particular position and with the particular speed, the basic recognition unit 104a advances to step S302.

In step S302, the basic recognition unit 104a judges whether the object overlaps with a predicted position of the host vehicle. If the object does not overlap with the predicted position of the host vehicle, the basic recognition unit 104a advances to step S303.

In step S303, the additional recognition unit 104b judges whether the object overlaps with the driving lane. If the object overlaps with the driving lane, the additional recognition unit 104b advances to step S304.

Note that the radar ECU 610 stores in advance the position of the vehicle ahead. Thus, the additional recognition unit 104b judges whether the object overlaps with the driving lane by judging whether the position of the driving lane on the road from the front camera 101 overlaps with the position of the vehicle ahead. If the object overlaps with the driving lane, the additional recognition unit 104b advances to step S304.

In step S304, the additional recognition unit 104b outputs control assist information 52 for execution of ACC on the vehicle ahead to the main network 10 at a time of the judgment that the object overlaps with the driving lane. The control assist information 52 for execution of ACC is also referred to as an ACC flag. At this time, the additional recognition unit 104b stores, in a storage unit 105, the control assist information 52 indicating that the radar ECU 610 is capable of ACC, that is, that the driving control system 600 is capable of braking.

Embodiment 5

Respects different from Embodiments 2 to 4 will be described in the present embodiment. Note that the same components as those in Embodiments 1 to 4 are denoted by the same reference characters and that a description thereof may be omitted.

Operation of an electronic control apparatus 500 and a driving control system 600 according to the present embodiment will be described with reference to FIGS. 11 and 12. FIG. 11 is a diagram showing an example of a logical configuration of the electronic control apparatus 500 according to the present embodiment. FIG. 12 is a flowchart showing operation of the driving control system 600 according to the present embodiment.

A rear camera ECU 702 including a rear camera 701 will be described as the electronic control apparatus 500 according to the present embodiment.

The rear camera ECU 702 has a parking slot guidance function as a basic function at the time of shipment of a vehicle from a factory. A space meaning that there is no object behind and a parking slot attribute are stored as recognition information. A sonar ECU 120 added after the shipment of the vehicle from the factory does not have a function alone.

The driving control system 600 has, as an additional function for the rear camera ECU 702, a parking slot guidance function capable of guiding to a parking slot even if the parking slot is chipped. For this reason, the rear camera ECU 702 acquires, from the sonar ECU 120, the positions of objects behind, such as a wall, a column, and another car. The rear camera ECU 702 acquires second sensing information from a sonar 121 via a sub-network 20 and calculates object position information with an additional recognition unit 104b.

In step S401, a basic recognition unit 104a judges whether a space is present at a particular position. If a space is present at the particular position, the basic recognition unit 104a advances to step S402.

In step S402, the basic recognition unit 104a judges whether the space is a parking slot. If the space is not a parking slot, the basic recognition unit 104a advances to step S403. If the space is a parking slot, the basic recognition unit 104a advances to step S404.

In step S403, the additional recognition unit 104b judges whether no object is present in a chipped parking slot. If no object is present in a chipped parking slot, the additional recognition unit 104b advances to step S404. The rear camera ECU 702 stores in advance the position of a space meaning that there is no object. Thus, even if a parking slot attribute is not yet to be determined, as in a case where a parking slot is chipped, the additional recognition unit 104b can judge whether no object is present in a chipped parking slot by judging whether there is no object located in such a space.

In step S404, the additional recognition unit 104b determines a parking slot attribute and outputs, to a main network 10, control assist information 52 meaning that guiding to a parking slot attribute is possible.

Methods for realizing an additional function in the driving control system 600 have been described in Embodiments 2 to 5. Examples of an additional function other than those described in Embodiments 2 to 5 will be described below.

AEB and ACC using learning
ACC with prediction and maps in mind
TJA and lane change assist with prediction and maps in mind Additionally, sensor fusion with a sensor not installed as standard equipment at the time of shipment of a vehicle from a factory has the following functions:

Night-time pedestrian detection with superimposed sensing information from an infrared camera
Advanced parking assist with superimposed sensing information from a sonar The latest standard and latest operation may be applied to the sub-network 20 or 30. A radio based on IEEE 802.11 may be installed. Additionally, use of a management server allows management or updating of software for each additional recognition unit.

In each of Embodiments 1 to 5, each unit of an electronic control apparatus has been described as an independent functional block. However, the configuration of an electronic control apparatus may not be a configuration like that of the above-described embodiment. Functional blocks of an electronic control apparatus may be configured in any manner as long as the functional blocks can realize the functions described in the embodiments.

A plurality of parts of Embodiments 1 to 5 may be combined and practiced. Alternatively, one part of the embodiments may be practiced. It does not matter how the embodiments are wholly or partly combined and practiced.

Note that the above-described embodiments are merely preferred examples in nature and are not intended to limit the scope of the present invention, the scope of applications of the present invention, and the scope of use of the present invention. Various changes can be made to the above-described embodiments, as needed.

REFERENCE SIGNS LIST

10: main network; 20, 30: sub-network; 31: first recognition information; 32: second recognition information; 51: recognition information; 52: control assist information; 100, 400: front camera ECU; 101: front camera; 102: control unit; 103, 201, 302: communication unit; 104a: basic recognition unit; 104b: additional recognition unit; 105: storage unit; 110, 610: radar ECU; 111: radar; 120: sonar ECU; 121: sonar; 301: arithmetic operator; 401: first electronic control apparatus; 402: second electronic control apparatus; 500: electronic control apparatus; 501: first sensor; 502: second sensor; 600: driving control system; 700: drive assistant; 701: rear camera; 702: rear camera ECU; 901: processor; 902: memory; 903: communication device

The invention claimed is:

1. A driving control system comprising:
a drive assistant mounted on a vehicle to execute a drive assist function that is a function of a drive assist system;
a first electronic control apparatus having a connection to a first sensor to recognize a status of surroundings of the vehicle and connected to the drive assistant via a main network; and
a second electronic control apparatus connected to the first electronic control apparatus via a sub-network that is different from the main network and having a connection to a second sensor to recognize the status of the surroundings of the vehicle, wherein
the second electronic control apparatus includes processing circuitry
to transmit second sensing information acquired by the second sensor to the first electronic control apparatus via the sub-network, and
the first electronic control apparatus includes processing circuitry
to receive information from the second electronic control apparatus, and
to output, to the main network, control assist information for execution of the drive assist function, the control assist information being generated on the basis of first recognition information on the surroundings of the vehicle and second recognition information on the surroundings of the vehicle, the first recognition information being calculated using first sensing information acquired by the first sensor, the second recognition information being calculated using the second sensing information received via the sub-network,
wherein the first and second sensors and the first and second electronic control apparatuses are mounted on the same vehicle as the drive assistant.

2. The driving control system according to claim 1, wherein
the processing circuitry of the first electronic control apparatus
stores the first recognition information,
outputs, to the main network, first control information for execution of a basic function of the drive assist function on the basis of the stored first recognition information,
stores the second recognition information, and
outputs, as the control assist information, second control information for execution of an additional function of the drive assist function to the main network on the basis of the stored first recognition information and the stored second recognition information, the additional function being to be added to the basic function.

3. The driving control system according to claim 2, wherein
the driving control system makes a diagnosis as to whether the additional function is maintainable and, if the additional function is not maintainable, maintains only the basic function.

4. The driving control system according to claim 2, comprising:

a repeater connected to the sub-network to relay communication between the first electronic control apparatus and the second electronic control apparatus.

5. The driving control system according to claim 2, wherein
the processing circuitry of the first electronic control apparatus calculates the second recognition information on the basis of the second sensing information.

6. The driving control system according to claim 2, comprising:
an arithmetic operator connected to the sub-network to receive the second sensing information from the second electronic control apparatus, to calculate the second recognition information on the basis of the second sensing information, and to transmit the second recognition information to the first electronic control apparatus.

7. The driving control system according to claim 2, wherein
each of the first recognition information and the second recognition information includes at least one of a position, a speed, a shape, and an attribute of an object in the surroundings of the vehicle.

8. The driving control system according to claim 7, wherein
the attribute includes a person, a car, a lane, a guardrail, or a sign.

9. A drive assist method for a vehicle having a mounted drive assistant to execute a drive assist function that is a function of a drive assist system, the drive assist method comprising:

connecting the drive assistant to a first electronic control apparatus having a connection to a first sensor to recognize a status of surroundings of the vehicle via a main network;

connecting the first electronic control apparatus to a second electronic control apparatus having a connection to a second sensor to recognize the status of the surroundings of the vehicle via a sub-network that is different from the main network;

transmitting, by the second electronic control apparatus, second sensing information acquired by the second sensor to the first electronic control apparatus via the sub-network;

receiving, by the first electronic control apparatus, the second sensing information via the sub-network; and outputting, to the main network, by the first electronic control apparatus, control assist information for execution of the drive assist function, the control assist information being generated on the basis of first recognition information on the surroundings of the vehicle and second recognition information on the surroundings of the vehicle, the first recognition information being calculated using first sensing information acquired by the first sensor, the second recognition information being calculated using the received second sensing information, wherein the first and second sensors and the first and second electronic control apparatuses are mounted on the same vehicle as the drive assistant.

* * * * *